(12) United States Patent
Edge et al.

(10) Patent No.: US 7,030,888 B1
(45) Date of Patent: Apr. 18, 2006

(54) COLOR PROCESSING

(75) Inventors: Christopher J. Edge, Saint Paul, MN (US); Timothy A. Fischer, Mendota Heights, MN (US); William A. Rozzi, Stillwater, MN (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/259,863

(22) Filed: Mar. 1, 1999

(51) Int. Cl.
*G09G 5/02* (2006.01)

(52) U.S. Cl. ...................................... 345/604; 345/600

(58) Field of Classification Search ................ 345/441, 345/154, 150, 591, 593, 604, 600, 603; 382/167
See application file for complete search history.

(56) References Cited

U.S. PATENT DOCUMENTS

| | | | | |
|---|---|---|---|---|
| 3,612,753 A | 10/1971 | Korman | ...................... | 178/5.2 |
| 4,500,919 A | 2/1985 | Schreiber | ...................... | 358/78 |
| 5,233,684 A * | 8/1993 | Ulichney | ...................... | 345/604 |
| 5,339,176 A | 8/1994 | Smilansky | ...................... | 358/504 |
| 5,377,025 A | 12/1994 | Spaulding | ...................... | 358/518 |
| 5,432,906 A | 7/1995 | Newman | ...................... | 395/162 |
| 5,526,140 A | 6/1996 | Rozzi | ...................... | 358/535 |
| 5,563,725 A | 10/1996 | Kumada et al. | | |
| 5,880,738 A * | 3/1999 | Donelly | ...................... | 345/431 |
| 5,903,275 A * | 5/1999 | Guay | ...................... | 345/590 |
| 5,999,703 A * | 12/1999 | Schwartz et al. | ............. | 358/1.9 |
| 6,037,950 A * | 3/2000 | Meir et al. | ................... | 345/427 |
| 6,044,173 A * | 3/2000 | Kumada | ...................... | 382/167 |
| 6,064,396 A * | 5/2000 | Ouchi et al. | ................. | 345/604 |
| 6,072,901 A | 6/2000 | Balonon-Rosen et al. | | |
| 6,088,038 A | 7/2000 | Edge et al. | | |
| 6,108,008 A * | 8/2000 | Ohta | ........................... | 345/431 |
| 6,157,735 A * | 12/2000 | Holub | ......................... | 382/167 |
| 6,307,961 B1* | 10/2001 | Balonon-Rosen et al. | .. | 382/167 |
| 6,362,808 B1 | 3/2002 | Edge et al. | | |

FOREIGN PATENT DOCUMENTS

| | | |
|---|---|---|
| EP | 0674430 | 9/1995 |
| WO | WO 93/20648 | 10/1993 |
| WO | WO 97/34409 | 9/1997 |
| WO | WO 99/01982 | 1/1999 |

OTHER PUBLICATIONS

WO 95/31794, Peterson et al., "Computer Graphics Color Management System", World Intellectual Property Organization, Nov. 23, 1995.*

International Color Consortium Profile Format Specification, Version 3.3, Nov. 11, 1996.

R.W.G. Hunt, Revised Colour-Appearance Model for Related and Unrelated Colours; 1991, John Wiley & Sons, Inc.; pp. 146-165.

Mark D. Fairchild et al,; Image Color-Appearance Specification Through Extension of CIELAB; 1993, John Wiley & Sons, Inc., pp. 178-190.

(Continued)

*Primary Examiner*—Amr A. Awad
*Assistant Examiner*—Motilewa Good-Johnson

(57) ABSTRACT

The invention provides a color processing method comprising determining whether a desired mapping between a first arrangement, including a first color device, and a second arrangement, including a second color device, exists, and automatically producing a mapping between the first arrangement and the second arrangement in the absence of such a desired mapping.

51 Claims, 8 Drawing Sheets

OTHER PUBLICATIONS

Mark D. Fairchild; Visual Evaluation and Evolution of the RLAB Color Space; Munsell Color Science Laboratory, Center for Imaging Science Rochester Institute of Technology, Rochester, New York; 1994.

Michael R. Pointer et al,; A Color Reproduction Index; 1994.

Dr. Edward Granger; Light Source, Inc.; A New Color Space for Image Appearance Equivalence; Seybold Seminars 1992; Abridged Conference Proceedings, pp. 47-48.

Jonathan Seybold et al,; Color and Imaging; Seybold Seminars 1992; Abridged Conference Proceedings; pp. 33-36.

Bruce J. Lindbloom; Accurate Color Reproduction for Computer Graphics Applications; Computer Graphics; vol. 23; No. 3; Jul. 1989.

International Color Profile Format; version 3.0, Jun. 10, 1994.

Gunter Wyszecki et al.; Color Science, Concepts and Methods, Quantitative Data and Formulae, $2^{nd}$ Edition; John Wiley & Sons.

Maureen C. Stone et al.; Color Gamut Mapping and the Printing of Digital Color Images; ACM Transactions on Graphics, vol. 7, No. 4, Oct. 1988, pp. 249-292.

Ron Clouthier et al.; Imaging Applications in the Work World; SPSE's International Symposium and Exposition on Electronic Imaging Devices and Systems '88; SPIE vol. 900. Minimization of Maximization of Functions; Chapter 10; Copyright 1988-1992.

U.S. Appl. No. 09/536,366, filed Mar. 27, 2000, entitled "Arrangement for Mapping Colors Between Imaging Systems and Method Therefor," by Edge, Christopher J. et al.Christopher J. Edge et al.

* cited by examiner

COLOR PROCESSING

BACKGROUND OF THE INVENTION

The invention relates to color processing and, more particularly, to reproducing colors from a source device using a destination device.

Many devices exist for producing color images. For example, in computer systems, monitors and printers produce color images and scanners measure color images. Monitors and scanners often use tricoordinate, e.g., red (R), green (G), and blue (B), color systems to implement a gamut of colors. These devices are thus said to be "RGB" devices. Because monitors emit light to produce colors, monitors are also called emissive devices. Some devices, such as printers, use four colors, e.g., cyan (C), magenta (M), yellow (Y), and black (K) to produce colors. These devices are called "CMYK" devices. Because these devices produce colors by depositing inks to absorb light, these devices are called absorptive devices.

It is often desirable to take the color image displayed, stored, or measured by one device, the "source" device, and reproduce that image using another device, the "destination" device. For example, computer system users may want to reproduce an image that is displayed on a monitor, the source device, by printing that image on paper using a printer, the destination device. The source and destination devices, however, may associate different colors with the same device coordinates (e.g., RGB), or may have different formats of device coordinates (e.g., RGB vs. CMYK) to characterize colors. Thus, to reproduce colors the source device coordinates are typically converted into destination device coordinates. It is desirable to convert these colors quickly and accurately so that the destination device quickly produces an image that looks like the image from the source device.

SUMMARY OF THE INVENTION

In one aspect, the invention provides a color processing method comprising determining whether a desired mapping between a first arrangement, including a first color device, and a second arrangement, including a second color device, exists, and automatically producing a mapping between the first arrangement and the second arrangement in the absence of such a desired mapping.

In another aspect, the invention provides a color processing method comprising providing, for a source device, source coordinates and corresponding source PCS data, the source PCS data being indicative of a source color associated with the source device corresponding to the source coordinates, and obtaining, for a destination device, a fourth destination coordinate using the source PCS data, or using the source coordinates, or using a combination of the source PCS data and the source coordinates, the destination device being adapted to produce a destination color in response to at least four destination coordinates, including three base destination coordinates and the fourth destination coordinate.

In another aspect, the invention provides a color processing apparatus comprising a mapping module adapted to build a mapping between source coordinates and destination coordinates, the mapping module including at least one device profile module adapted to obtain a set of source PCS data corresponding to a set of source coordinates using a source device profile that provides a forward mapping of sets of source coordinates to sets of source color data and adapted to obtain a set of destination PCS data corresponding to a set of destination coordinates using a destination device profile that provides a forward mapping of sets of destination coordinates to sets of destination color data, the mapping module further including a linker coupled to the at least one device profile module and adapted to correlate source coordinates and destination coordinates using the source PCS data and the destination PCS data, wherein the mapping module is adapted to selectively couple to a preference module and to build the mapping of the source coordinates to the destination coordinates according to data received from the preference module.

In another aspect, the invention provides a color processing system comprising a mapping module adapted to build a mapping between source coordinates and destination coordinates, the mapping module including at least one device profile module adapted to obtain a set of source PCS data corresponding to a set of source coordinates using a source device profile that provides a forward mapping of sets of source coordinates to sets of source color data and adapted to obtain a set of destination PCS data corresponding to a set of destination coordinates using a destination device profile that provides a forward mapping of sets of destination coordinates to sets of destination color data, the mapping module further including a linker coupled to the at least one device profile module and adapted to correlate source coordinates and destination coordinates using the source PCS data and the destination PCS data, and the system further comprising a preference module selectively coupled to the mapping module, the preference module being adapted to affect the mapping of the source coordinates to the destination coordinates.

In another aspect, the invention provides a computer program product, residing on a computer readable medium, comprising instructions for causing a computer to determine whether a desired mapping exists between a first arrangement, including a first color device, and a second arrangement, including a second color device, and to automatically produce a mapping between the first arrangement and the second arrangement in the absence of such a desired mapping.

In another aspect, the invention provides a computer program product, residing on a computer readable medium, comprising instructions for causing a computer to build a mapping between source coordinates and destination coordinates, the instructions to build the mapping including instructions for causing the computer to obtain a set of source PCS data corresponding to a set of source coordinates using a source device profile that provides a forward mapping of sets of source coordinates to sets of source color data, to obtain a set of destination PCS data corresponding to a set of destination coordinates using a destination device profile that provides a forward mapping of sets of destination coordinates to sets of destination color data, to correlate source coordinates and destination coordinates using the source PCS data and the destination PCS data, and to effect the building of the mapping according to a preference module, if a preference module is coupled to the computer.

Embodiments of the invention may provide one or more of the following advantages. Color images can be reproduced from one CMYK device to another CMYK device while maintaining the integrity of the color information, as indicated by device-independent profile connecting space data, including the K information from the source. Different forms of characterizing or profiling digital color devices, such as algebraic vs. table look up, L*a*b* vs. spectral data, can be accommodated. Consistent gamut mapping can be accomplished using International Color Consortium (ICC) profiles from different vendors. Spectral model profiles of devices can be used that provide benefits for image archival because the core color information is retained. Effective gamut mapping can be achieved. Accuracy between forward and reverse transformations of a given profile can be achieved regardless of profile format or vendor. Multiple conversions of the same image to and from a device can be performed without significant degradation in image appearance. Color reproduction can be dynamically configured with respect to illuminant, observant, color space, gamut mapping, etc. Forward compatibility is provided for portions of the color reproduction such as new definitions of color space, color appearance, gamut mapping, etc. Different methods of gray component replacement (GCR) can be accommodated without having to create or obtain new device profiles. Users can customize color reproduction by selecting different options for portions of a color reproduction process, e.g., by selecting options using various apparatus or by connecting a plug-in having desired features. Gamut mapping, GCR, and PCS calculation can be provided in plug-and-play modules.

DESCRIPTION OF PREFERRED EMBODIMENTS

The invention provides improved color processing to reproduce colors from a source device to a destination device. A link between the source device and the destination device is either retrieved or produced. The link relates coordinates of the source device to coordinates of the destination device. These coordinates correspond to colors for the respective devices. The same coordinates can represent different colors for different devices. The link associates sets of coordinates that correspond to the same, or close to the same, color. Thus, when a color image from the source device is to be reproduced using the destination device, the image can be reproduced pixel by pixel using the link. The link is used to convert each pixel from the source device using interpolation, e.g., linear interpolation, to determine a set of corresponding device coordinates. The corresponding set of device coordinates are conveyed to the destination device to produce the color indicated by the destination coordinates.

The invention helps ensure color fidelity of color images regardless of the source and destination devices. The invention does not primarily rely on profiles to provide desired mapping between device-independent data and device coordinates. In the reverse transformation, from device-independent data to device coordinates, particular forms of gamut mapping and color appearance modeling are often implemented. The invention can use existing profiles for the source and destination devices if they provide desired conversions of device coordinates to device-independent coordinates. These existing profiles can be used to process data in a very fast manner. The invention can accurately reproduce color images regardless of the quality or form of the reverse transformations provided by the device profiles.

Figure 1:
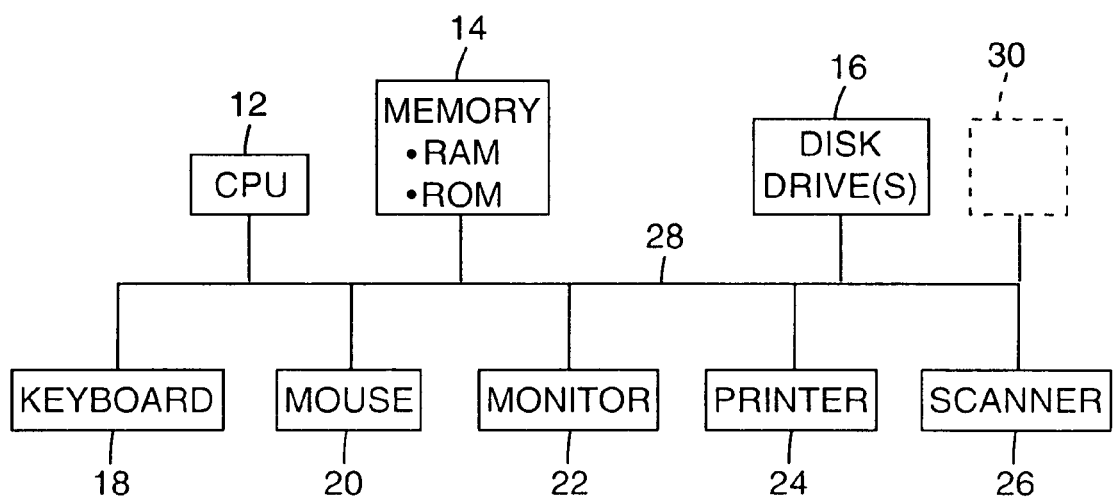
FIG. 1 is a block diagram of a computer system for implementing a color processing system according to the invention.

As shown in FIG. 1, a computer system 10 includes a central processing unit (CPU) 12, memory 14, one or more disk drives 16, a keyboard 18, a mouse 20, a monitor 22, a color printer 24, and a scanner 26 all connected by a bus 28. The system 10 can be expanded by connecting more devices to bus 28 as indicated by an expansion box 30. For example, a card or chip can be added to the system 10 to provide new or different functions than those already provided. The memory 14 can be, as indicated, random-access memory (RAM) or read-only memory (ROM). The disk drives can include, e.g., a floppy disk drive, a CD ROM drive, a hard disk drive, and/or a zip drive. The system 10 can implement a color processing system by, e.g., controlling the CPU 12 with software stored in the memory 14 and/or on disks in the disk drive(s) 16. The bus 28 can provide connections through networks such as the Internet. Thus, for example, the printer 24 can be located remote from other components of the system 12.

The keyboard 18, mouse 20, and/or monitor 22 are all user interface apparatus and can be used by a user to control the system 10. The user can operate the keyboard 18 and mouse 20 to provide input to the system 10, including commands to perform desired functions. The monitor 22 may also be able to receive input from the user, e.g., if the monitor 22 is a touch-sensitive monitor.

The monitor 22, color printer 24, and scanner 26 are capable of producing and/or measuring color images. For example, the monitor 22 can produce color images by emitting combinations of red, green, and blue light from screen pixels of the monitor 22. These lights are produced in amounts corresponding to red, green, and blue (RGB) coordinates, respectively. The printer 24 can produce colors in an absorptive manner by depositing absorptive colors, e.g., cyan, magenta, yellow, and black (CMYK) on a substrate such as a sheet of paper. The amounts of these colors depend on appropriate CMYK coordinates for actuating the printer 24. Also, the scanner 26 can measure color images, quantifying portions of the image into RGB coordinates according to the amounts of red, green, and blue light reflected by each portion of the image. The scanner 26 can be a multipurpose device, such as a combination of a scanner, a facsimile machine, and a copier, such that the scanner 26 can also produce images. For each device 22, 24 and 26, a set of device coordinates is associated with each piece or pixel of the image, the piece's color corresponding to the set of device coordinates.

The CPU 12 can transfer and process data from one of the devices 22, 24 and/or 26, the source device, to another one of the devices 22, 24 and/or 26, the destination device. Whether a device is the source or the destination depends on how it is being used. The CPU 12 can process source device coordinates associated with the source device 34. The CPU 12 can provide the processed source device coordinates to the destination device in the format of destination device coordinates for use by the destination device to produce an image.

An operating system of the computer system 10 controls the CPU 12 to process data in response to commands from the user. These commands are received through the user interface apparatus 18, 20 and 22. Through the CPU 12, the operating system communicates with the components of the computer system 10, including the source and destination devices, and a color processing system in order to reproduce images from the source device using the destination device. The color processing system communicates with the operating system, receiving blocks of source device coordinates, converting these coordinates to destination device coordinates, and communicating the destination device coordinates to the operating system. Thus, the color processing system communicates with source and destination devices through the operating system. This is the case when stated in this application that a portion of the color processing system communicates with a component of the computer system 10, unless stated otherwise. The operating system can store data sent to or received from the color processing system in an image data file, e.g., in the memory 14.

Figure 2:
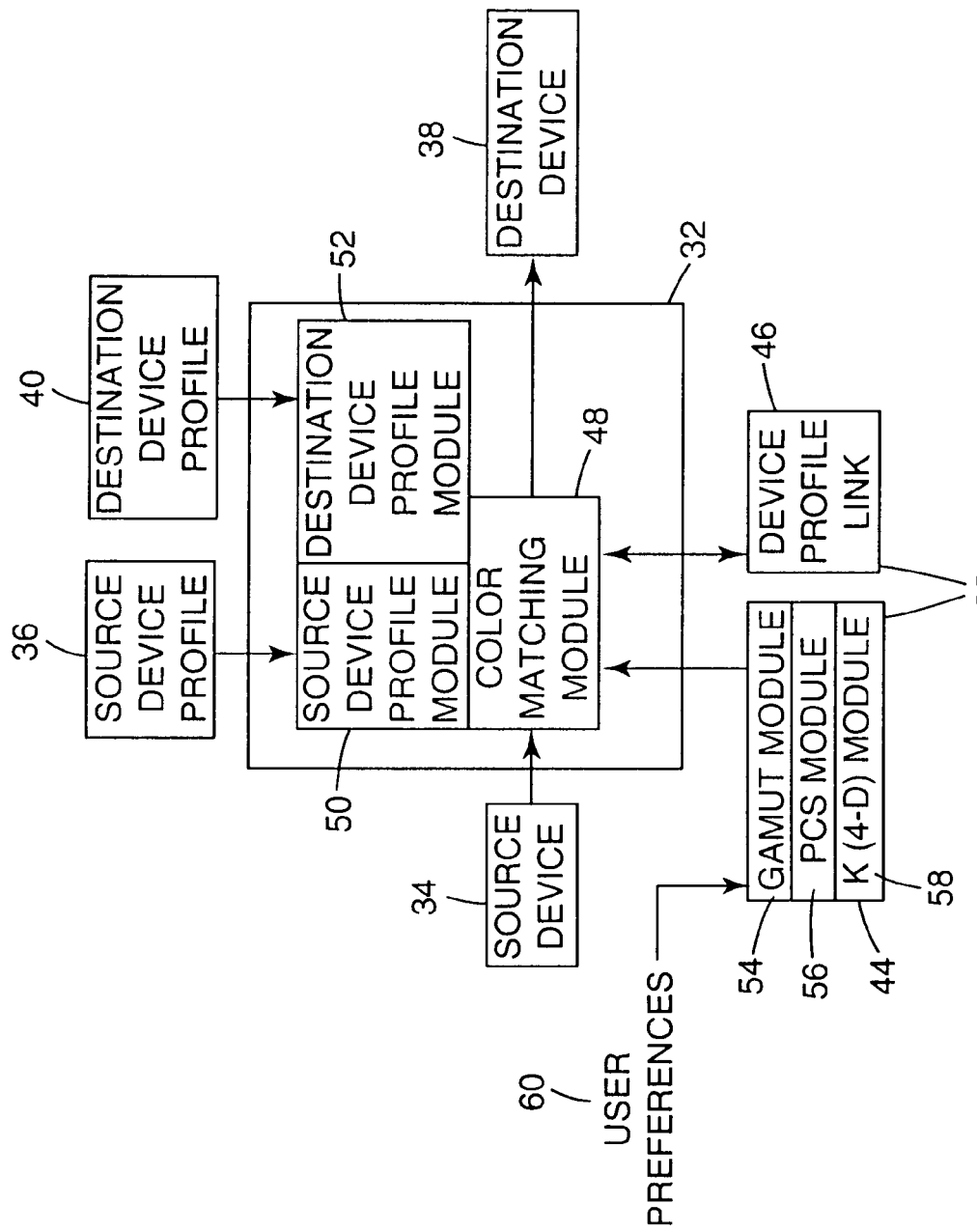
FIG. 2 is a block diagram of several components of color processing system.

As shown in FIG. 2, a color processing system 32 for reproducing color images includes a mapping module 42, user-preference modules 44, and a device profile link 46. As indicated by arrows in FIG. 2, the system 32 communicates through the operating system with a source device 34 and a corresponding source device profile 36, and a destination device 38 and a corresponding destination device profile 40. The color mapping module 42 includes a color matching module 48, a source device profile module 50 and a destination device profile module 52. The user-preference modules 44 include a gamut module 54, a profile connecting space (PCS) module 56, and a K (4-D) module 58. All of the above-mentioned modules and the modules discussed below comprise software code stored on computer readable media such as the memory 14, disks in the disk drives 16, or other memory devices connected to the bus 28 to expand the system 10. Preferably, the software code includes instructions for controlling the CPU 12 and is derived (compiled) from object-oriented software code of a computer language such as C++, although other computer languages may be used. As used throughout this application, saying that a first module or other information is received by, or handed off to, a second module means that the second module has access to and can use the first module or information. This can be accomplished, for example, by providing an address to the second module where the first module or other information is located. Additionally, this can mean actually transmitting the software code of the first module or the actual data comprising the information to the second module to become part of the second module.

As indicated by arrows in FIG. 2, the mapping module 42 can communicate with the source device 34, the destination device 38, the device profiles 36 and 40, the user-preference modules 44, and the device profile link 46. The description below refers to data being transferred to and from, and processed in, the software modules to refer, respectively, to the data being transferred to and from, and processed in, the CPU 12 under the respective module's control.

The color mapping module 42 can communicate with and coordinate interaction between components of the system 32, the devices 34 and 38, and the profiles 36 and 40 to produce the link 46 between the devices 34 and 38, and to reproduce color images using the link 46. By communicating with these other components, the color mapping module 42 can determine whether a link 46 exists between the source device 34 and the destination device 38, including the preferences indicated by the user-preference modules 44. If such a link 46 exists, e.g., is stored in the memory 14, then the color mapping module 42 can convert a color image from the source device 34 to the destination device 38 using the link 46. If the link 46 does not exist, then the color mapping module 42 can initiate and coordinate the production of the link 46 in accordance with the preferences indicated in the user-preference modules 44.

The three user-preference modules 44, i.e., the gamut module 54, the PCS module 56, and K module 58, are selectable, configurable modules that can affect the mapping of source colors to destination colors. Each of these modules 54, 56, and 58, is configured as a plug-in module that can be removed and replaced with a different module. Alternatively, the modules 44 can be configured as a single unit, with different units having different configurations of modules 54, 56, and 58 (e.g., different features and/or combinations). The preference modules 44 are configured to be accessed by a standard set of queries and to provide data in response to these queries in standard formats. Multiple modules of the same type can exist. For example, more than one gamut module 54 may be inserted in the disk drives 16 or stored in the memory 14 and a desired one of the multiple gamut modules 54 can be chosen for use. Thus, the modules 54, 56, and 58, are selectable in that they can be removed and replaced or one of several modules of the same type can be chosen for use. Each of the modules 54, 56, and 58, is also configurable according to information received in the user preferences 59. The user preferences can indicate what module or other option the user desires, and parameters for each of the modules 54, 56, and 58. Thus, the user can customize the color mapping and reproduction performed by the system 32.

The source device profile 36 and the destination device profile 40 provide mappings of device coordinates to device-independent color data. These mappings provide literal characterizations of the dependence of colors on device coordinates. These mappings can be in the form of mathematical relationships or look-up tables. The profiles 36 and 40 include both forward and reverse mappings of device coordinates and color data. The profiles 36 and 40 can be configurable with respect to observer conditions such as illuminant, observer, etc., or nonconfigurable such as ICC profiles that use D50 as the illuminant. The forward transformation maps device coordinates to device-independent color data, and the reverse transformation maps device-independent color data to device coordinates. The device color data can take any of a variety of forms of device-independent data, such as spectral, XYZ, L*a*b*, an ICC format, or a custom format. Proprietary portions or tags can be provided to describe the profile contents. The device profiles 36 and 40 are either provided by the manufacturer of the device on a computer-readable disk provided with the device or generated by a third-party application. The profiles 36 and 40 can be stored in the memory 14, in one or more disks, or at the device itself. The profiles 36 and 40 can be read from their disks, or be read directly from the devices 34 or 38 if stored therein, or be stored in and read from the memory 14. The data in the device profiles 36 and 40 can be used by the device profile modules 50 and 52.

Figure 3:
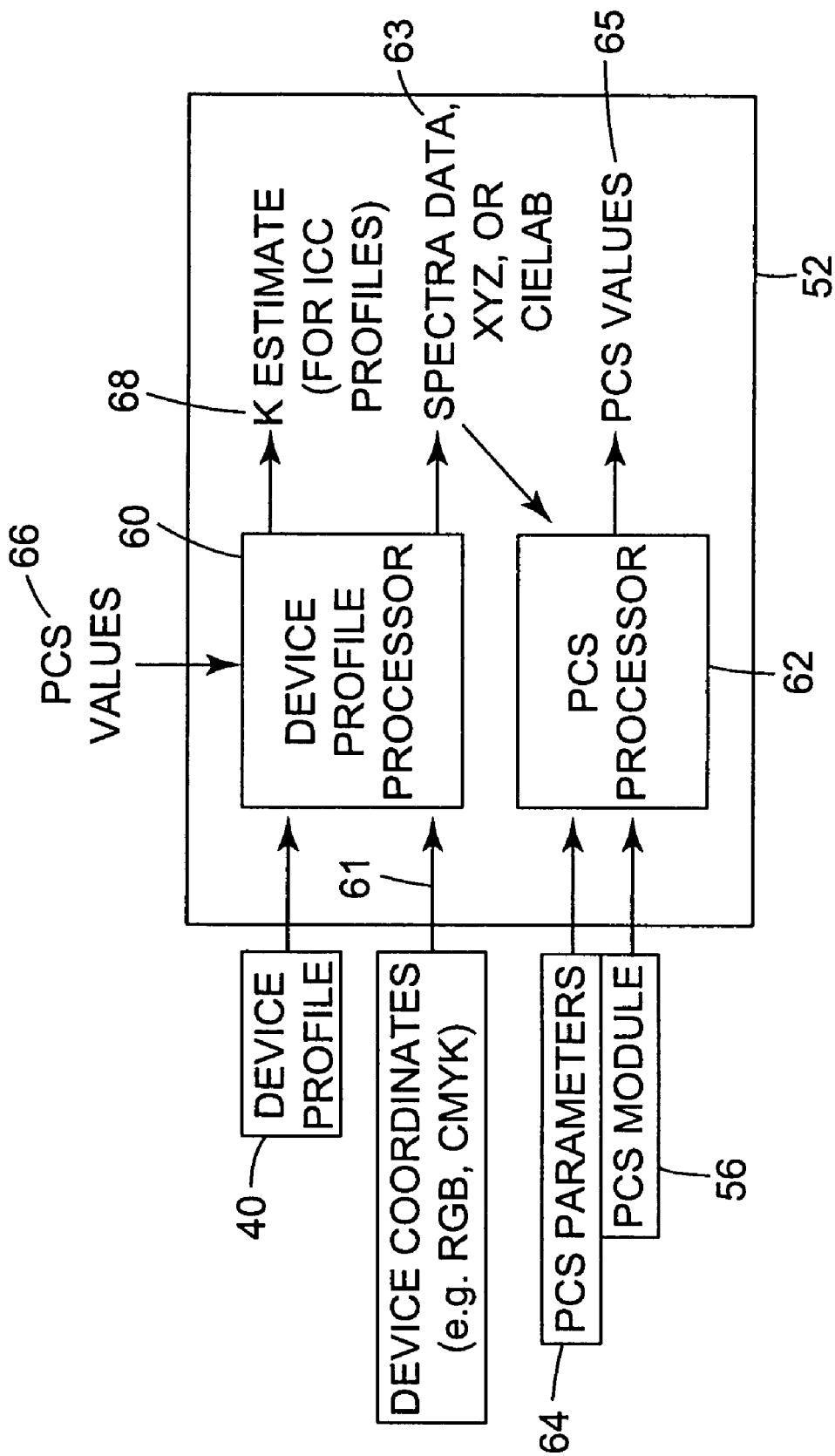
FIG. 3 is a block diagram illustrating interactions between a device profile module and other portions of the color processing system shown in FIG. 2.

As shown in FIG. 3, the destination device profile module (DPM) 52 includes a device profile processor 60 and a profile connecting space (PCS) processor 62. The destination DPM 52 and the source DPM 50 (FIG. 2) can be the same software code used twice, once with the source device profile 36 and once with the destination device profile 40. Alternatively, the source DPM 50 and the destination DPM 52 can be different sets of software code. For at least some embodiments, the device profile processor 60 of the destination DPM 52 needs to be able to receive and process PCS values while the device profile processor 60 of the source DPM 50 does not. Thus, with the substantial similarity of the source DPM 50 and the destination DPM 52 in mind, only the destination DPM 52, shown in FIG. 3, is detailed here.

The destination device profile processor 60 uses the destination device profile 40 to obtain destination color data 63 corresponding to received destination device coordinates 61. The device profile 40 is a mathematical description of what color the destination device 38 produces or measures, as represented by color data 63 in the device profile 40, corresponding to a set of destination device coordinates 61. The profile 40 can be in a standard format, such as an ICC format, or a custom format. The device profile processor 60 receives the device coordinates 61, e.g., from a device link generator discussed below. The device profile processor 60 obtains a set of device-independent color data 63 corresponding to the received set of device coordinates 61. The processor 60 determines the most flexible information obtainable from the profile 40, e.g., XYZ data for an ICC profile 40 with given observer conditions, or spectral data for a spectrally-based profile 40. Using the forward transformation in the device profile 40 and the device coordinates, the processor 60 interpolates to obtain the device-independent color data 63. The device profile processor 60 provides the obtained set of color data 63 to the PCS processor 62.

Using the color data 63 received from the device profile processor 60 the PCS processor 62 determines corresponding PCS. The PCS processor 62 can receive the PCS module 56 and PCS parameters 64, and can calculate the PCS values 65 using a color space in accordance with the PCS module 56 and the PCS parameters 64. The PCS parameters can be, e.g., media white XYZ, illuminant white XYZ, black point XYZ, or a black point scaling factor. The PCS parameters 64 are configurable and can be part of, or stored in association with, the PCS module 56, or be specified by the user through the user interface apparatus 18, 20 and 22. The PCS processor 62 implements the color space by providing the received color data 63 and the PCS parameters 64 to the PCS module 56.

The PCS module 56 calculates the PCS values 65 from the color data 63 in accordance with the PCS parameters 64. The PCS module 56, according to what PCS module 56 is used (e.g., plugged in or otherwise selected), can implement a variety of profile connecting spaces (i.e., color spaces that output device-independent data). For example, the PCS module 56 can process XYZ color data 63 according to the CIE-L*a*b* PCS:

$$L^* = \alpha (Y/Y_n)^{1/\gamma} - \beta$$

$$a^* = \theta [(X/X_n)^{1/\gamma} - (Y/Y_n)^{1/\gamma}]$$

$$b^* = \phi [(Y/Y_n)^{1/\gamma} - (Z/Z_n)^{1/\gamma}]$$

where $\alpha$, $\beta$, $\gamma$, $\theta$, and $\phi$ are configurable PCS parameters 64, and $X_n$, $Y_n$, and $Z_n$ are the tristimulus values of a perfect white diffuser. The tristimulus values $X_n$, $Y_n$, and $Z_n$ can be modified for a variable white reference vector based on PCS parameters as described in a patent application also entitled "Color Processing" filed concurrently with this application, and in patent application Ser. No. 08/882,561 filed Jul. 3, 1997, and Ser. No. 08/883,635 filed Jun. 27, 1997, both entitled "Arrangement for Mapping Colors Between Imaging Systems and Method Therefor," assigned to the assignee of this application, and incorporated herein by reference. For CIE 1976, $\alpha=116$, $\beta=16$, $\gamma=3$, $\theta=500$, and $\phi=200$. The value of $\gamma$ can be selected, e.g., for "brightly lit", "moderately lit", or "poorly lit" conditions. Alternatively, other PCSs such as proprietary, custom, PCSs can be implemented. If the color data 63 are already in a PCS format such as CIE-L*a*b*, then the PCS module 56 can convert the color data 63 to new PCS data 65 according to the particular selected conversion, including the selected PCS parameters 64. The PCS module 56 returns the computed PCS values 65 to the PCS processor 62. The PCS processor 62 outputs the calculated PCS values 65.

The destination device profile processor 60 can receive PCS values 66 and obtain a corresponding estimate for a black value to be used by a destination device 38 to reproduce the color associated with the received PCS values 66. If the destination device 38 (FIG. 2) is a CMYK device with an ICC profile, then the device profile 40 received by the device profile processor 60 will also include a reverse transformation mapping PCS values to CMYK device coordinates. The device profile processor 60 can use received, e.g., relative calorimetric, PCS values 66 and the reverse transformation in the device profile 40 to obtain a corresponding set of device coordinates in a manner similar to that described above for obtaining color data 63 corresponding to device coordinates 61. The K value from the obtained set of device coordinates becomes a K estimate 68.

The reverse transformation can be used to determine values for colors aside from black. If the destination device 38 has a custom color and a corresponding device coordinate for this custom color, then the device profile processor 60 can be used to determine a coordinate for this custom color using received PCS value 66. For example, if a particular company has a distinct color associated with it, then a device such as a printer may include a custom ink corresponding to this color. The technique for determining a device coordinate from a set of PCS values 66 and the reverse transformation of that device can be used for any color coordinate. This technique is preferably used when the destination device coordinates are at least four dimensional and the coordinate determined from the reverse transformation is the device coordinate corresponding to the fourth or higher dimension. The technique can be used, however, when the device coordinates are three-dimensional or less, and to determine the coordinate for one or more of the base colors. For example, this option can be selected by the user, e.g., if the user wants to reproduce colors with adherence to ICC standards if the device profile 40 is an ICC profile, or if the device profile is produced using desired transformations. Using this option, the DPM 52 can operate very quickly, without needing to convert the color data 63 to PCS values 65.

Therefore, the device profile module 52 outputs a set of PCS data corresponding to the received set of destination device coordinates 61, and, if the destination device 38 has an ICC profile and one or more device coordinates in addition to three base device coordinates, an estimate for each additional device coordinate.

Figure 4:
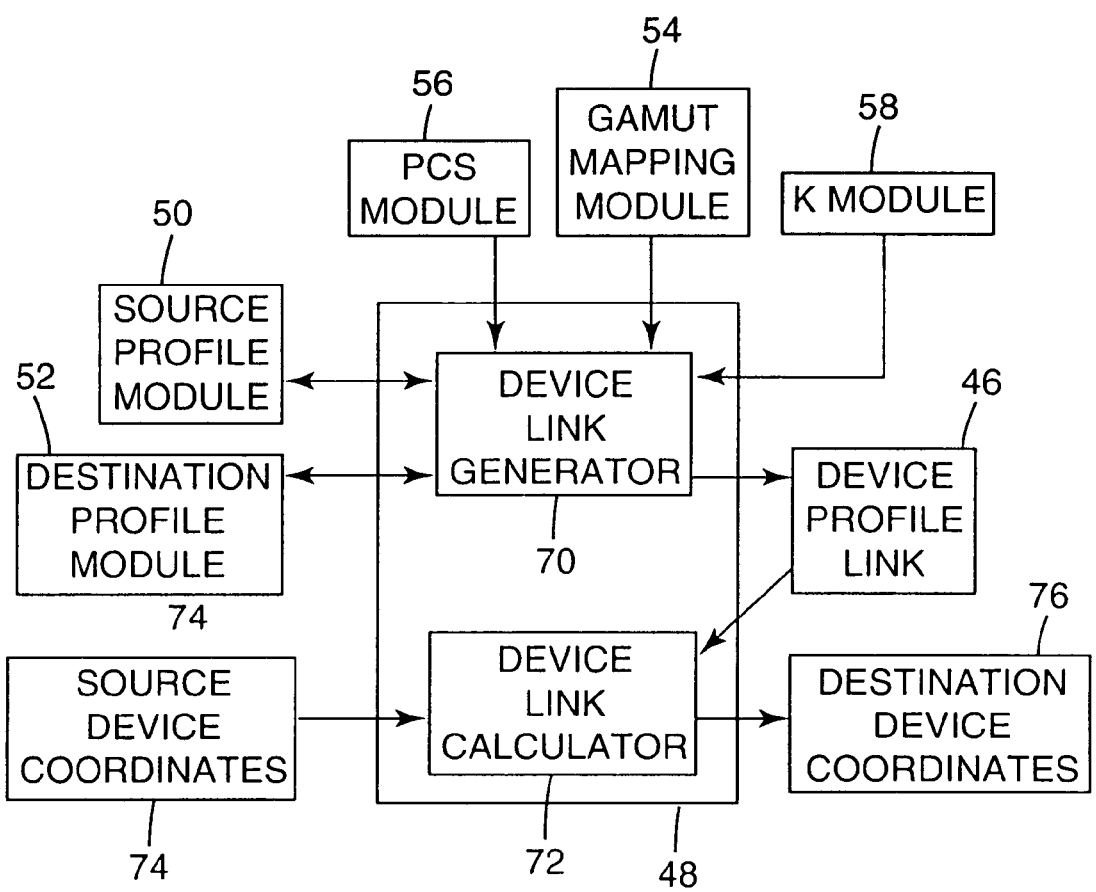
FIG. 4 is a block diagram illustrating interactions between a color matching module and other portions of the color processing system shown in FIG. 2.

As shown in FIG. 4, with reference to FIG. 2, the color matching module 48 includes a device link generator 70 and a device link calculator 72. The device link generator 70 receives, and communicates with, the destination device profile module 52, the source device profile module 50, the PCS module 56, the gamut module 54, and the K (4-D) module 58. The device link generator 70 also communicates with the device profile link 46. The device link calculator 72 can receive source device coordinates 74 and output corresponding destination device coordinates 76.

The device link generator 70 can determine whether a link 46 exists between the source device 34 and the destination device 38, and if the link 46 does not exist, can initiate and coordinate the generation of the link 46. The device link generator 70 can also determine characteristics of the device profiles 36 and 40 such as their sizes, the increments between device coordinates in the profiles 36 and 40, and the format of the device coordinates (e.g., RGB, CMYK, etc.) including whether the device coordinates are 4-dimensional or higher order. The device link generator 70 can produce a look-up table to form the device profile link 46.

The device link calculator 72 can convert sets of source device coordinates 74 associated with an image from the source device 34 to corresponding sets of destination device coordinates 76 for reproducing that image using the destination device 38. To do this, the device link calculator 72 looks up a received set of source device coordinates 74 in the device profile link 46 and outputs the corresponding set of destination device coordinates 76 from the device profile link 46. If necessary, the device link calculator 72 can interpolate to obtain the set of destination device coordinates 76.

Figure 5:
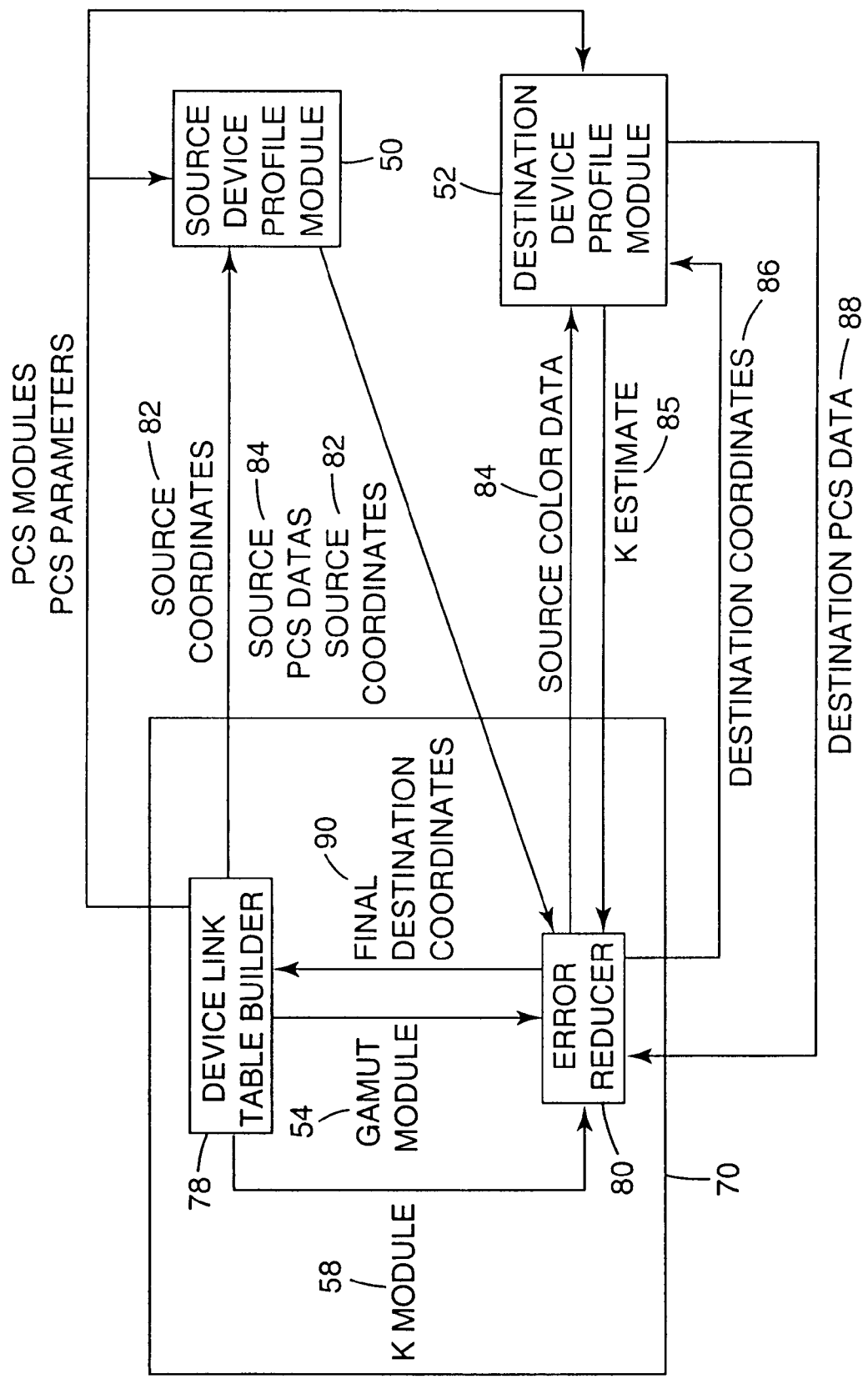
FIG. 5 is a block diagram illustrating interactions between device link generator, shown in FIG. 4, and other portions of the color processing system shown in FIG. 2.

As shown in FIG. 5, the device link generator 70 includes a device link table builder 78 and an error reducer 80. The device link table builder 78 communicates with the source device profile module 50, the destination device profile module 52, and the error reducer 80 to produce the mapping between source device coordinates and destination device coordinates to be stored in the device profile link 46.

The device link table builder 78 produces source coordinates 82 for the mapping of the device profile link 46 (FIG. 4). The table builder 78 can produce a series of source coordinates in a methodical fashion. For example, if the source device 34 is an RGB device, then the table builder 78 can produce a series of sets of RGB coordinates from (0,0,0) to (1,1,1) with methodical increments of the three source coordinates in between. The increments produced by the table builder 78 may or may not correspond to the increments in the source device profile 36 (FIG. 2). For example, the source device profile 36 may have source coordinates (0,0,0), (0,0,0.1), (0,0,0.2) . . . (1,1,1), while the table builder 78 can produce the series (0,0,0), (0,0,0.2), (0,0,0.4) . . . (1,1,1), or another series with different increments. Alternatively, the table builder 78 can communicate with the source device profile module 50 to determine the increments of source coordinates stored in the source device profile 36 and produce a series of source device coordinates corresponding to those stored in the source device profile 34. The table builder 78 can supply the produced source coordinates 82 to the source device profile module 50 for further processing. If a set of source coordinates 82 does not correspond to a stored set of source coordinates in the source device profile 36, then the source DPM 50 can interpolate as described above.

The table builder 78 can also hand off various modules and other information. The table builder 78 can hand off the selected PCS module 56 (FIGS. 2–3) and the selected PCS parameters 64 (FIG. 3) to the source DPM 50 and the destination DPM 52. Also, the table builder 78 can hand off the selected K module 58 and the selected gamut module 54 to the error reducer 80.

The error reducer 80 can operate in accordance with the K module 58 and the gamut module 54, and communicate with the DPMs 50 and 52 to obtain destination coordinates corresponding to received source coordinates 82. The error reducer 80 can receive the gamut module 54 and the K module 58 from the table builder 78, and the source coordinates 82 and corresponding source PCS data 84 from the source device profile module 50. The error reducer 80 can determine a set of destination coordinates 86 dependent on the source coordinates 82 and/or the source PCS data 84 in accordance with the K module 58 if desired, e.g., if the set of destination coordinates 86 have four or more coordinates.

The error reducer 80 can determine initial values for destination coordinates 86 corresponding to base colors in a variety of manners. For example, a neutral gray color can be used as an initial guess for the destination coordinates 86. Alternatively, the error reducer 80 can determine an initial guess for the destination coordinates 86 as follows:

if the source and destination devices 34 and 38 have RGB coordinates, then:

$R_{destination}=R_{source}$ $G_{destination}=G_{source}$ $B_{destination}=B_{source}$;

if the source device 34 has RGB coordinates and the destination device 38 has CMY (or CMYK) coordinates, then:

$C_{destination}=1-R_{source}$ $M_{destination}=1-G_{source}$ $Y_{destination}=1-B_{source}$;

if the source and destination devices 34 and 38 have CMY (or CMYK) coordinates, then:

$C_{destination}=C_{source}$ $M_{destination}=M_{source}$ $Y_{destination}=Y_{source}$ if the source device 34 has CMY (or CMYK) coordinates and the destination device 38 has RGB coordinates, then:

$R_{destination}=1-C_{source}$ $G_{destination}=1-M_{source}$ $B_{destination}=1-Y_{source}$.

The K module 58 can regulate how the error reducer 80 determines one or more of the destination coordinates 86. For example, if the destination device 38 is a CMYK device, then the destination K coordinate can be determined in at least three different ways. First, if the source device 34 has a K coordinate, then the initial destination K coordinate can be calculated from the source K information by mapping the source K to the destination K to try to minimize the PCS error between them in order to reduce the error to a tolerable amount as indicated, e.g., by L* or by L*, a*, and b*. This can be implemented by using a look-up table, or a mathematical relationship, etc. Second, if the destination device profile 40 (FIG. 2) is an ICC profile, then the K module 58 can cause the error reducer 80 to provide the received source PCS data 84 to the destination DPM 52. The destination DPM 52 can return a K estimate 85 in response to PCS data, e.g., the received source PCS data 84, as described above with respect to FIG. 3. Third, the K module 58 can cause the error reducer 80 to produce a value of K according to the values of the other destination coordinates 86 previously produced by the error reducer 80. For example, the K module 58 can impose a mathematical rule, e.g., $$\text{if min}(C, M, Y)_{destination} = \begin{cases} 100\%, & \text{then } K = 100\% \quad (1) \\ 80\%, & \text{then } K = 50\% \quad (2) \\ < 50\%, & \text{then } K = 0\%. \quad (3) \end{cases}$$

The manner in which K is determined according to the K module 58 is selectable, e.g., by plugging in a different K module 58 or by choosing among options provided by the K module 58. The value(s) determined by the K module 58 is(are) combined with the determined base color coordinates to complete the set of destination coordinates 86.

The error reducer 80 can provide the determined destination coordinates 86 to the destination DPM 52 and receive corresponding destination color data 88 for further processing by the error reducer 80. The destination DPM 52 determines the destination color data 88 in accordance with the forward transformation provided in the destination device profile 40 as described above with respect to FIG. 3, and returns the determined destination color data 88 to the error reducer 80. The error reducer 80 can compare the destination color data 88 received from the destination DPM 52 with the source PCS data 84 received from the source DPM 50. The error reducer 80 can determine whether an error between the source PCS data 84 and the destination color data 88 meets desired criteria, e.g., whether the error is within a desired range. The desired error criteria can have several components such as $\Delta L^*$, $\Delta a^*$, and $\Delta b^*$. When the error meets the desired criteria, the error is acceptable.

To reduce the error between the destination color data 88 and the source PCS data 84 to an acceptable level, or to further reduce an already acceptable error, the error reducer 80 can iterate the destination coordinates 86. Thus, the desired criteria for an acceptable error can also be, e.g., whether the reduction in error between iterations is within a desired range of zero, indicating that further iteration will only slightly reduce the error if at all, or will increase the error. The error reducer 80 can apply non-linear error reduction methods to iterate the destination coordinates to reduce the error. Exemplary techniques are described in co-pending application Ser. No. 08/882,561 and 08/883,635, referenced above. The iteration by the error reducer 80 is still subject to the K module 58 if desired, such as if the destination device 38 is a four-dimensional or higher order device. For example, if the error reducer 80 iterates values of C, M, and Y, then K may still be determined according to a formula such as equations (1)–(3). Alternatively, if the K value was determined from the reverse transformation provided in the destination device profile 40, then the value of K may be fixed at this value. If the error does not reduce to an acceptable level, the error reducer 80 can fix one coordinate, e.g., C, and vary the other destination coordinates 86, including K, in a controlled manner.

If the error does not reduce to an acceptable level, then the error reducer 80 can also implement the gamut module 54 to help reduce the visual error between the destination color data 88 and the source PCS data 84. For example, the gamut module 54 can weight or adjust the desired criteria for the error (e.g., increasing the acceptable $\Delta L^*$ and decreasing the acceptable $\Delta a^*$ and $\Delta b^*$). The error reducer 80 can then compare the source PCS data 84 with the destination color data 88 and determine whether the error meets the weighted criteria and is therefore acceptable. The error reducer 80 can again iterate the destination coordinates 86 to reduce the error. While the unweighted error may increase in this iteration process, it has been found that the visual error is improved. If desired, such as by selection by the user through the user interface apparatus 18, 20, or 22, this weighting of the error criteria by the gamut module 54 can be implemented always and not just when the error reducer 80 cannot reduce the error to an acceptable level.

The error reducer 80 can provide final destination coordinates 90 to the device link table builder 78. Preferably, the final destination coordinates 90 are the destination coordinates 86 corresponding to the destination color data 88 that has an acceptable error when compared to the source PCS data 84.

Referring also to FIG. 4, the device link table builder 78 can receive and use the final destination coordinates 90 to build the device profile link 46. The table builder 78 stores the source coordinates 82 in association with the corresponding final destination coordinates 90 in the device profile link 46. The table builder 78 can store multiple corresponding sets of source coordinates 82 and destination coordinates 90 to form a look-up table constituting the device profile link 46. The device profile link 46 therefore maps the source coordinates 82, corresponding to a color at the source device 34, with the destination coordinates 90 corresponding to the same or similar color at the destination device 38.

Figure 6:
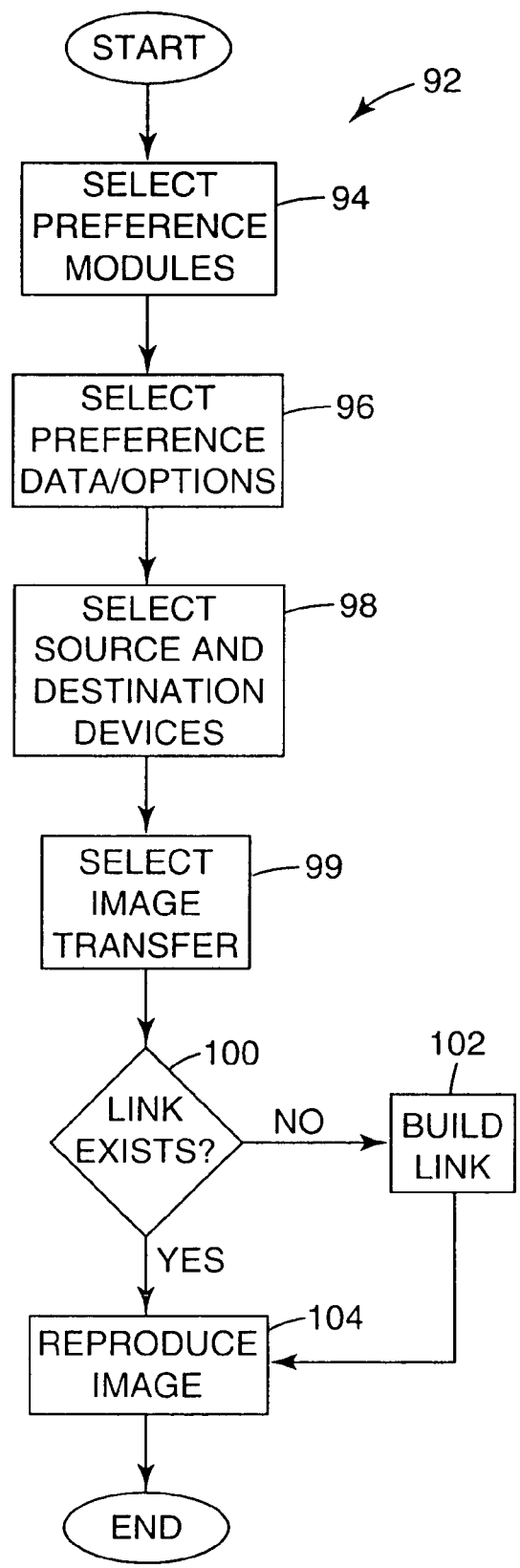
FIG. 6 is a flow diagram of a method of processing colors using the system shown in FIG. 1.

FIG. 6 shows a method 92 for processing a color image to reproduce a color image from the source device 34 (FIG. 2) using the destination device 38. Using the method 92, a link between the source device 34 and the destination device 38 with selected user preferences 59 can be retrieved if it exists, and produced if it does not exist. The link can be used to convert the colors in the image on a pixel by pixel basis to determine the device coordinates needed by the destination device 38 to reproduce the colors from the source device 34. The determined destination coordinates can be used to produce the corresponding colors at the destination device 38. For purposes of illustration, the method 92 is described below for an RGB monitor source device and a CMYK printer destination device (the "RGB-to-CMYK example").

As shown, the method 92 begins with the preference modules 44 shown in FIG. 2 being selected at stage 94. The user selects desired preference modules 44, e.g., by plugging in desired modules 44 or by choosing from multiple preference modules 44 that are available, e.g., plugged into the disk drives 16 or stored in the memory 14. For example, the user can select a PCS module 56 for implementing absolute colorimetry from a set of PCS modules 56 that are available. The same applies for selection of the gamut module 54 and the K-module 58. Thus, if appropriate modules are available the user can, e.g., decide whether to determine a K estimate from determined PCS data, to use the reverse profile of an ICC destination device 38 to determine the K estimate 85, or to determine base coordinates and estimate a value for the K coordinate based on the determined base coordinates.

At stage 96, the user selects preference/data options. The user selects or enters data/options such as the desired PCS parameters 64 (FIG. 3) using the user interface apparatus 20, 22, and 24. Additionally, if the K-module 58 includes multiple options for producing the K coordinate, the user also selects which of these options to use.

At stage 98 the source device 34 and the destination device 38 are selected. This selection can be made by the user choosing to reproduce the color image from the source device 34 to the destination device 38. For example, the user can operate the user interface apparatus 18, 20, or 22 (FIG. 1) to indicate to the system 10 to reproduce the color image from a desired source device 34 using a desired destination device 38. To do this the user could select an icon displayed on the monitor in order to display a color image from, e.g., the scanner 26 on, e.g., the monitor 22. Alternatively and for the RGB-to-CMYK example, the user selects a print option thereby selecting the monitor 22 as the source device 34 and the printer 24 as the destination device 38.

At stage 99, the user selects to transfer the color image from the desired source device 34 to the desired destination device 38. The selection of the source and destination devices 34 and 38 can be inherent in the image transfer selection. For example, by selecting a print screen option, the user inherently selects the monitor 22 as the source device 34 and the printer 24 previously designated as the default device to be the destination device 38.

At stage 100 the color processing system 32 determines whether a device profile link 46 exists corresponding to the selected source device 34, the selected destination device 38, the selected preference modules 44, and the selected preference/data options. The device link generator 70 (FIG. 4) in the color matching module 48 (FIG. 2) queries the memory 14 for stored device profile links 46. The device link generator 70 determines from the data stored in association with the stored device profile links 46 whether a link between the selected source and destination devices 34 and 38 with the selected preference modules 44 and preference/data options has been stored. If the link has been stored, then the method 92 proceeds to stage 104 where the color image from the source device 34 is reproduced using the destination device 38 as more fully described below with respect to FIG. 8. If this link has not been stored, then the method 92 proceeds to stage 102 where the link is built as described below with respect to FIG. 7. Once the link has been built and stored at stage 102, the method 92 proceeds to stage 104 for production of the color image. After reproduction of the color image, the method 92 ends.

Figure 7:
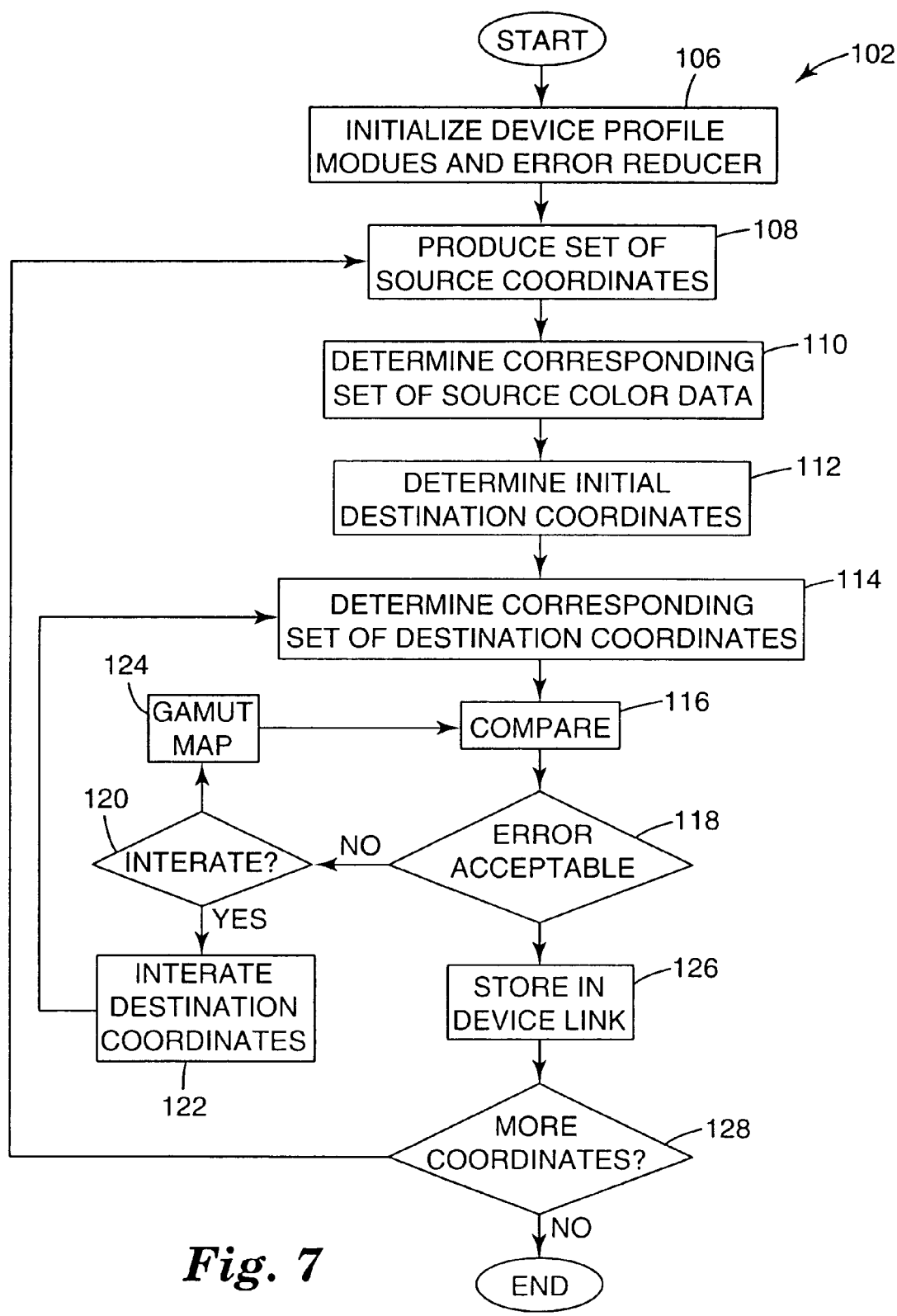
FIG. 7 is a flow diagram of a method of building a link mapping coordinates of a source device to coordinates of a destination device.

As shown in FIG. 7, the method 102 of building the device profile link 46 begins at stage 106 with the initialization of the device profile modules 50 and 52 (FIG. 2) and the error reducer 80 (FIG. 5). To initialize the DPMs 50 and 52, the device link generator 70 (FIG. 4) hands off the selected PCS module 56 and the selected PCS parameters 64 to the DPMs 50 and 52. The device link table builder 78 (FIG. 5) hands off the selected gamut module 54 and the selected K-module 58 to the error reducer 80.

At stage 108, the device link table builder 78 produces sets of source coordinates 82, 61 (FIGS. 5 and 3). The table builder 78 queries the source device 50 to determine the format of the source device coordinates stored in the source device profile 36. The table builder 78 methodically produces a set of source coordinates 82, 61 in the format of the source coordinates stored in the source device profile 36.

The set of source coordinates 82, 61 produced by the table builder 78 at stage 108 is used at stage 110 to determine a corresponding set of source PCS data 84. The table builder 78 provides the source coordinates 82, 61 to the source DPM 50. The source DPM 50 uses the source device profile 36 and the source coordinates 82, 61 to determine, interpolating if necessary, a corresponding set of source PCS data 84 according to the PCS module 56 and the PCS parameters 64 handed off by the table builder 78.

The set of source coordinates 82, 61 produced in stage 108 and/or the corresponding set of PCS data 84 determined in stage 110 are used in stage 112 to determine an initial set of destination coordinates 86. The error reducer 80 receives the source PCS data 84 and the source coordinates 82 form the source device profile module 50. The error reducer 80 manipulates the received source coordinates 82 and/or the source PCS data 84 to produce three initial destination coordinates 86 corresponding to three base colors of the destination device 38 by, e.g., applying simple mathematical relationships to the source coordinates 82. If the destination device 38 has more than three coordinates in a set of destination coordinates 86, then the error reducer 80 implements the K-module 58 in order to determine the initial destination coordinates 86 above and beyond the three base coordinates. Continuing the RGB-to-CMYK example and assuming the second mode of operation of the K module 58 as described above, as shown in FIG. 5 the error reducer 80 provides the source PCS data 84 to the destination DPM 52. The destination DPM 52 accesses the reverse transformation stored in the destination device profile 40 to determine a corresponding K estimate. This K estimate is returned by the destination DPM 52 to the error reducer 80. The error reducer 80 combines the K estimate with the previously-determined base coordinates to form a set of destination coordinates 86.

The destination coordinates 86 are used at stage 114 to determine a corresponding set of destination color data 88. The error reducer 80 provides the destination coordinates 86 to the destination DPM 52. The destination DPM 52 accesses the destination device profile 40 and determines a corresponding set of destination color data 88 using the forward transformation stored in the destination profile device 40.

At stages 116 and 118 the source PCS data 84 are compared with the destination PCS data 88 and a query is made as to whether the error between these data 84 and 88 is acceptable. At stage 116 the error reducer 80 compares the received source PCS data 84 with the received destination source PCS 88 to determine and error between these data 84 and 88. At stage 118 a check is made to determine whether the error is acceptable. For example, the error reducer 80 can determine whether the error is within an acceptable range of values.

If the error between the source PCS data 84 and the destination PCS data 88 is not acceptable, then the error reducer 80 queries at stage 120 whether to iterate the destination coordinates 86. If the error reducer 80 determines that iteration of the destination coordinates 86 could reduce the error between the source PCS data 84 and the destination PCS data 88, such as if no iteration has been performed yet, then the error reducer 80 proceeds to iterate the destination coordinates 86 at stage 122. The error reducer 80 iterates the destination coordinates 86 according to the K module 58 to non-linearly reduce the error between the source PCS data 84 and the source destination PCS data 88. The error reducer 80 can also vary the K value in a controlled manner to reduce the error. For example, if the error reducer 80 determines that iterating the base coordinates can reduce the error but that iterations without varying the K value will insignificantly reduce the error, then the error reducer 80 can vary the value of K. Once the iteration of destination coordinates 86 is completed, the method 102 returns to stage 114 to determine a set of destination PCS data 88 corresponding to the iterated destination coordinates 86.

If the error reducer 80 determines that iterating the destination coordinates 86 will insignificantly reduce the error, then gamut mapping is performed at stage 124. The gamut mapping will weight the criteria for an acceptable error. The method 102 returns to stage 116 to compare the destination PCS 88 with the source data PCS data 84.

Once the error between the source PCS data 84 and the destination PCS data 88 is acceptable, the method 102 proceeds to stage 126 where the source coordinates 82 and the corresponding destination coordinates 86 are stored in the device profile link 46. Once the error is acceptable the error reducer 80 transmits the final destination coordinates 90 (FIG. 5) to the device link table builder 78. The device link table builder 78 stores the source coordinates 82 and the corresponding final destination coordinate 90, corresponding to the final value of the destination coordinates 86, in the device profile link 46. The table builder 78 also stores indications of the selected user preferences 59, including the selected preference modules 44, in the device profile link 46. The device profile link 46 therefore includes indications of the devices mapped, the preferences selected, and the mapping between coordinates of the source device 34 and the destination device 38.

At stage 128 a query is made as to whether more sets of source coordinates 82 are to be mapped for storage in the device profile link 46. If more sets of device coordinates 82 are to be mapped then the method 102 returns to stage 108 where the device link table builder 78 methodically produces the next set of source coordinates 82. If no more sets of source coordinates 82 are desired, then the method 102 ends.

Returning to FIG. 6 when it is determined that a link exist in stage 100, or once a link is built in 102, the desired image is reproduced at stage 104.

Figure 8:
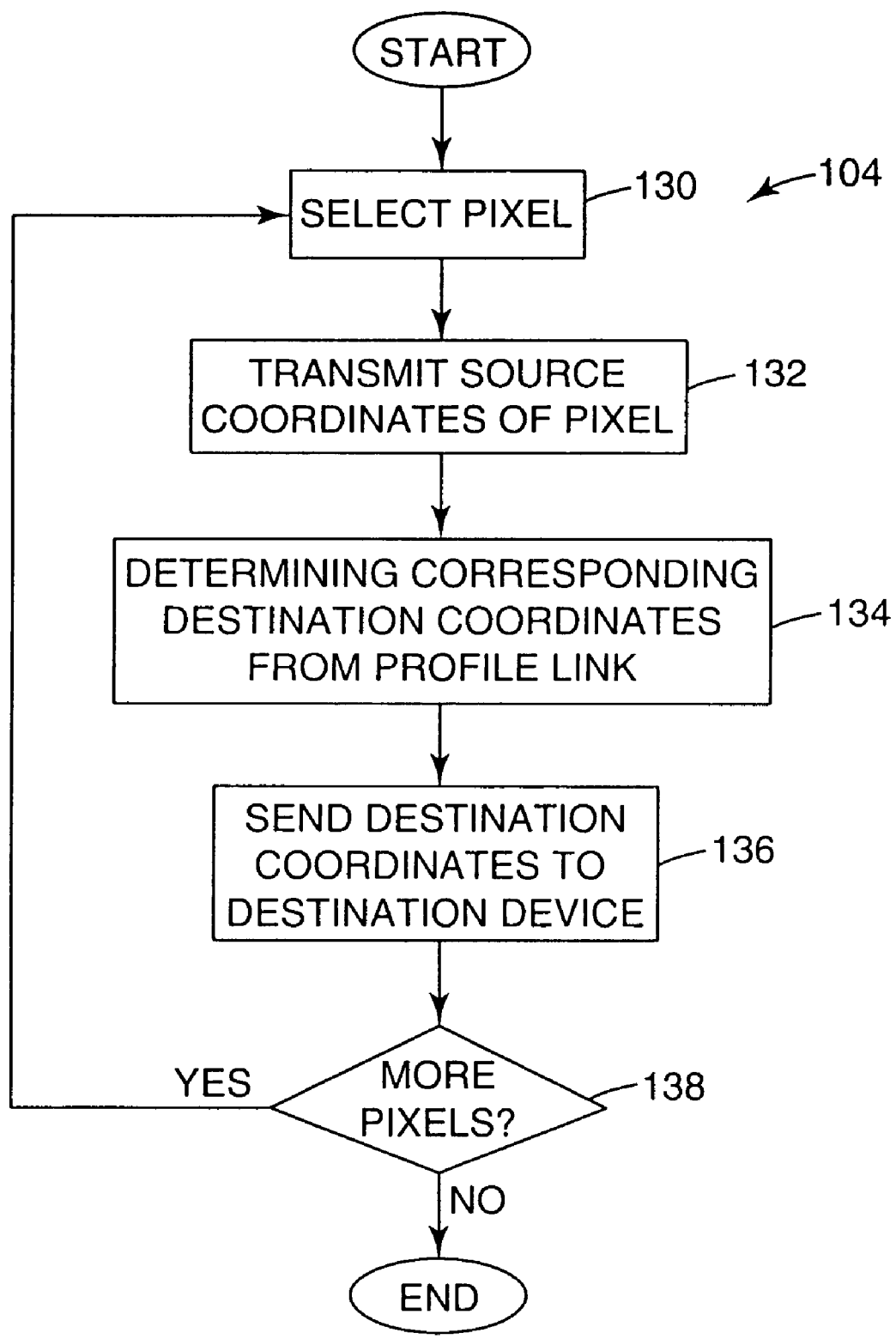
FIG. 8 is flow diagram of method of reproducing an image form a source device to a destination device using a stored link.

As shown in FIG. 8, the method 104 of reproducing the desired image from the source device 34 using the destination device 38 begins at stage 130 with a pixel in the image to be reproduced being selected. The pixel is selected from a block of data transferred from the operating system to the color processing system 32 (FIG. 2). The block of data includes the pixels and corresponding coordinates, and an indication of how many pixels are in the block of data. Referring also to FIG. 4, the source coordinates 74 of a pixel from the color image are transmitted to the device link calculator 72 at stage 132. At stage 134, the device link calculator 72 accesses the device profile link 46 and determines the set of destination coordinates 76 corresponding to the source device coordinates 74, interpolating if necessary. At stage 136 the determined destination coordinates 76 are sent by the device link calculator 72 to the destination device 38 via the operating system. The destination device 38 uses the destination device coordinates 76 to produce a color at a corresponding pixel of the destination device 38. At stage 138, the device link calculator 72 queries whether more pixels at the source device 34 need to have their colors reproduced. If so, then the method 104 returns to stage 130 for the selection of another pixel. If not, then the method 104 ends.

Other embodiments are within the scope of the impending claims. For example, the K module 58 is not limited to the reproduction of K values. This module can be used to produce other colors, such as custom colors associated with a particular device, or one or more of the base colors of devices with only three coordinates. Also, the device link table builder 78, instead of methodically producing sets of source coordinates to be mapped into the device coordinates, can methodically select the sets of source coordinates stored in the source profile 36. Also, the modules can be implemented using hardware, hard wiring, firmware or a combination of any of these with or without software code. Data can be transferred to and from the modules if the modules are at least partially not software.

A quick-operating alternative to the procedure outlined for stages 112 and 114 is also possible. The error reducer 80 can provide the source PCS data 84 to the destination device profile 52, which accesses the reverse transformation stored in the destination device profile 40 to determine the destination color data 88. This option can be selected by the user through the user interface apparatus 18, 20 or 22. This option can be used, for example, if the destination device profile 40 was produced using the desired preferences, e.g., the desired profile connecting space, gamut mapping, K generation, etc. There will be no error because no destination PCS data 88 is produced. By using the technique, time is saved by eliminating the need to iterate the destination coordinates 86. The time saved, however, may not be worth the accuracy lost if the destination device profile 40 was not produced using the desired preferences.

What is claimed is:

1. A color processing method comprising:
    determining whether a desired mapping between a first arrangement, including a first color device, and a second arrangement, including a second color device, exists for user preferences relating to gamut mapping and profile connecting space (PCS); and
    automatically producing a mapping between the first arrangement and the second arrangement in the absence of such a desired mapping.

2. The method of claim 1 further comprising retrieving the desired mapping between the first arrangement and the second arrangement if such mapping exists.

3. The method of claim 1 wherein determining whether the desired mapping between first and second arrangements exists includes determining whether user preferences associated with an existing mapping match currently-selected user preferences.

4. The method of claim 1, further comprising determining whether the desired mapping exists for user preferences relating to gray component replacement (GCR).

5. The method of claim 1 wherein the first arrangement is a source arrangement, the first device is a source device, the second arrangement is a destination arrangement, and the second device is a destination device adapted to produce destination colors corresponding to source colors indicated by the source device, the method further comprising:
    obtaining a set of source PCS data corresponding to a set of source coordinates using a forward transformation of the source device;
    obtaining a first set of destination PCS data corresponding to a set of destination coordinates using a forward transformation of the destination device; and
    iterating the destination coordinates, if a first error between the set of source PCS data and the first set of destination PCS data is unacceptable, to produce a second set of destination PCS data such that a second error between the set of source PCS data and the second set of destination PCS data is less than the first error.

6. The method of claim 5 further comprising;
    methodically producing sets of source coordinates;
    storing the sets of source coordinates in association with sets of destination coordinates that yield acceptable errors between PCS data corresponding to the sets of source and destination coordinates.

7. The method of claim 5 wherein obtaining the set of source PCS data comprises processing a set of source color data, obtained using the forward transformation of the source device, according to a source PCS module, wherein the source PCS module is interchangeable with other PCS modules.

8. The method of claim 7 wherein the source PCS module processes the set of source color data according to modifiable source PCS parameters.

9. The method of claim 8 further comprising weighting at least one acceptable-error criterion if the second error is unacceptable.

10. The method of claim 5 wherein obtaining the set of destination PCS data comprises processing a set of destination color data, obtained using the forward transformation of the destination device, according to a destination PCS module, wherein the destination PCS module is interchangeable with other PCS modules.

11. The method of claim 10 wherein the destination PCS module processes the first set of destination PCS data according to modifiable destination PCS parameters.

12. The method of claim 5 wherein if the set of destination coordinates includes at least four coordinates, then at least one coordinate of an initial set of destination coordinates is obtained using the set of source coordinates.

13. The method of claim 5 wherein if the set of destination coordinates includes at least four coordinates, then at least one coordinate of an initial set of destination coordinates is obtained using the second set of source PCS data and a reverse transformation of the destination device.

14. A color processing method comprising:
providing, for a source device, source coordinates and corresponding source profile connecting space (PCS) data, the source PCS data being indicative of a source color associated with the source device corresponding to the source coordinates; and
obtaining, for a destination device, a fourth destination coordinate using, based on user preference, either the source PCS data, or the source coordinates, or a combination of the source PCS data and the source coordinates, the destination device being adapted to produce a destination color in response to at least four destination coordinates, including three base destination coordinates and the fourth destination coordinate.

15. The method of claim 14 wherein the fourth destination coordinate is a destination black coordinate indicative of an amount of black associated with the destination color.

16. The method of claim 15 wherein the destination black coordinate corresponds to an amount of black associated with the source color and the source device as indicated by the source PCS data.

17. The method of claim 15 wherein the destination black coordinate is related to the source PCS data by a mathematical relationship.

18. The method of claim 14 further comprising:
obtaining the three base destination coordinates;
determining destination PCS data using a forward transformation of destination coordinates to destination PCS data using the obtained destination coordinates;
determining an error between the source PCS data and the determined destination PCS data; and
if the error is greater than a desired error:
  iterating the destination coordinates;
  determining new destination PCS data; and
  determining the error between the source PCS data and the new destination PCS data.

19. The method of claim 18 wherein iterating the destination coordinates non-linearly reduces the error.

20. A color processing method comprising:
providing, for a source device, source coordinates and corresponding source profile connecting space (PCS) data, the source PCS data being indicative of a source color associated with the source device corresponding to the source coordinates; and
obtaining, for a destination device, a fourth destination coordinate using either the source PCS data, or the source coordinates, or a combination of the source PCS data and the source coordinates, the destination device being adapted to produce a destination color in response to at least four destination coordinates, including three base destination coordinates and the fourth destination coordinate,
wherein the fourth destination coordinate is a destination black coordinate indicative of an amount of black associated with the destination color; and
wherein the destination coordinates are CMYK coordinates and the destination black coordinate is obtained using a reverse transformation of destination PCS data to destination CMYK coordinates using the source PCS data.

21. A color processing method comprising:
providing, for a source device, source coordinates and corresponding source profile connecting space (PCS) data, the source PCS data being indicative of a source color associated with the source device corresponding to the source coordinates; and
obtaining, for a destination device, a fourth destination coordinate using either the source PCS data, or the source coordinates, or a combination of the source PCS data and the source coordinates, the destination device being adapted to produce a destination color in response to at least four destination coordinates, including three base destination coordinates and the fourth destination coordinate,
wherein the fourth destination coordinate is a destination black coordinate indicative of an amount of black associated with the destination color, and
wherein the destination coordinates are CMYK coordinates and the destination black coordinate is determined according to $$\text{if } \min(C, M, Y)_{destination} = \begin{cases} 100\%, & \text{then } K = 100\% \\ 80\%, & \text{then } K = 50\% \\ < 50\%, & \text{then } K = 0\%. \end{cases}$$

22. A color processing method comprising:
providing, for a source device, source coordinates and corresponding source profile connecting space (PCS) data, the source PCS data being indicative of a source color associated with the source device corresponding to the source coordinates; and
obtaining, for a destination device, a fourth destination coordinate using either the source PCS data, or the source coordinates, or a combination of the source PCS data and the source coordinates, the destination device being adapted to produce a destination color in response to at least four destination coordinates, including tree base destination coordinates and the fourth destination coordinate,
wherein the fourth destination coordinate is indicative of an amount of a custom color associated with the destination color.

23. A color processing apparatus comprising:
a mapping module adapted to build a mapping between source coordinates and destination coordinates, the mapping module including:
at least one device profile module adapted to obtain a set of source profile connecting space (PCS) data corresponding to a set of source coordinates using a source device profile that provides a forward mapping of sets of source coordinates to sets of source color data and adapted to obtain a set of destination PCS data corresponding to a set of destination coordinates using a destination device profile that provides a forward mapping of sets of destination coordinates to sets of destination color data; and
a linker coupled to the at least one device profile module and adapted to correlate source coordinates and destination coordinates using the source PCS data and the destination PCS data;
wherein the mapping module is adapted to selectively couple to a preference module that defines user preferences relating to gamut mapping and profile connecting space (PCS), and to build the mapping of the source coordinates to the destination coordinates according to data received from the preference module.

24. The apparatus of claim 23 wherein the destination coordinates include three base coordinates and a fourth coordinate, and the mapping module is adapted to receive gray component replacement (GCR) data from the preference module indicating how to obtain the fourth coordinate.

25. The apparatus of claim 23 wherein the at least one device profile module is adapted to provide a set of source color data to the preference module and to receive the corresponding set of source PCS data from the preference module.

26. The apparatus of claim 23 wherein the preference module can weight error criteria if an error between the source PCS data and the destination PCS data fails to meet unweighted error criteria.

27. The apparatus of claim 26 wherein the linker is adapted to provide estimated destination coordinates to the at least one device profile module to obtain corresponding destination device PCS data, to compare the source PCS data with such destination PCS data and, if an error between the source PCS data and the destination PCS data is undesirable, to iterate the estimated destination coordinates to non-linearly reduce the error.

28. The apparatus of claim 23 wherein the at least one device profile module is adapted to obtain a first set of destination coordinates corresponding to a first set of source PCS data using a reverse mapping of sets of destination coordinates to PCS data, and wherein the linker is adapted to correlate a first set of source coordinates, associated with the first set of source PCS data, with the first set of destination coordinates.

29. A color processing system comprising:
a mapping module adapted to build a mapping between source coordinates and destination coordinates, the mapping module including:
at least one device profile module adapted to obtain a set of source profile connecting space (PCS) data corresponding to a set of source coordinates using a source device profile that provides a forward mapping of sets of source coordinates to sets of source color data and adapted to obtain a set of destination PCS data corresponding to a set of destination coordinates using a destination device profile that provides a forward mapping of sets of destination coordinates to sets of destination color data;
a linker coupled to the at least one device profile module and adapted to correlate source coordinates and destination coordinates using the source PCS data and the destination PCS data; and
a preference module selectively coupled to the mapping module, the preference module being adapted to effect the mapping of the source coordinates to the destination coordinates based on user preferences relating to gamut mapping and profile connecting space (PCS).

30. The system of claim 29, wherein the preference module is adapted to effect the mapping of the source coordinates to the destination coordinates based on user preferences relating to gray component replacement (GCR).

31. The system of claim 29 wherein the preference module is a PCS module adapted to convert device color data from a device profile module into PCS data corresponding to the device color data.

32. The system of claim 31 wherein the PCS module converts the device color data to PCS data according to configurable PCS parameters.

33. The system of claim 32 wherein the source color data are spectral data.

34. The system of claim 32 further comprising a gamut module adapted to weight error criteria.

35. The system of claim 34 wherein the linker is adapted to provide estimated destination coordinates to the at least one device profile module to obtain corresponding destination device PCS data, to compare the source PCS data with such destination PCS data and, if an error between the source PCS data and the destination PCS data is undesirable, to iterate the estimated destination coordinates to non-linearly reduce the error, wherein the gamut module alters the error criteria if the non-linearly reduced error is undesirable.

36. The system of claim 29 wherein the destination coordinates include three base coordinates and a fourth coordinate, and the preference module is adapted to control production of the fourth coordinate based on a gray component replacement (GCR) method specified by a user.

37. The system of claim 36 wherein the destination coordinates are CMYK coordinates and the fourth coordinate is a K coordinate indicative of an amount of black to be used by a destination device to produce a color corresponding to the destination coordinates.

38. The system of claim 37 wherein the preference module is adapted to apply a mathematical relationship to the tree base coordinates to control production of the K coordinate.

39. A color processing system comprising:
a mapping module adapted to build a mapping been source coordinates and destination coordinates, the mapping module including:
at least one device profile module adapted to obtain a set of source profile connecting space (PCS) data corresponding to a set of source coordinates using a source device profile that provides a forward mapping of sets of source coordinates to sets of source color data and adapted to obtain a set of destination PCS data corresponding to a set of destination coordinates using a destination device profile that provides a forward mapping of sets of destination coordinates to sets of destination color data;
a linker coupled to the at least one device profile module and adapted to correlate source coordinates and destination coordinates using the source PCS data and the destination PCS data; and a preference module selectively coupled to the mapping module, the preference module being adapted to effect the mapping of the source coordinates to the destination coordinates based on user preferences relating to gamut mapping and profile connecting space (PCS), wherein the destination coordinates include three base coordinates and a fourth coordinate, and the preference module is adapted to control production of the fourth coordinate based on a gray component replacement (GCR) method specified by a user, wherein the destination coordinates are CMYK coordinates and the fourth coordinate is a K coordinate indicative of an amount of black to be used by a destination device to produce a color corresponding to the destination coordinates, and wherein the preference module controls production of the K coordinate such that the K coordinate is obtained using a reverse mapping of destination color data to destination coordinates using the source PCS data.

40. A computer program product, residing on a computer readable medium, comprising instructions for causing a computer to:

determine whether a desired mapping exists between a first arrangement, including a first color device, and a second arrangement, including a second color device for user preferences relating to gamut mapping and profile connecting space (PCS); and automatically produce a mapping between the first arrangement and the second arrangement in the absence of such a desired mapping.

41. The computer program product of claim 40 further comprising instructions to cause the computer to retrieve the desired mapping between the first arrangement and the second arrangement if such mapping exists.

42. The computer program product of claim 40 wherein the mapping maps source coordinates to destination coordinates, the first arrangement is a source arrangement, the first device is a source device, the second arrangement is a destination arrangement, the second device is a destination device adapted to produce destination colors corresponding to destination coordinates, and the instructions for causing the computer to produce the mapping include instructions for causing the computer to:

obtain a set of source PCS data corresponding to a set of source coordinates using a forward transformation of the source device;

obtain a first set of destination PCS data corresponding to a set of destination coordinates using a forward transformation of the destination device; and iterate, if a first error between the first set of destination PCS data and the set of source PCS data is unacceptable, the destination coordinates to produce a second set of destination PCS data such that a second error between the set of source PCS data and the second set of destination PCS data is smaller than the first error.

43. The computer program product of claim 40, wherein the instructions cause the computer to determine whether the desired mapping exists for user preferences relating to gray component replacement (GCR).

44. A computer program product, residing on a computer readable medium, comprising instructions for causing a computer to:

build a mapping between source coordinates and destination coordinates, the instructions to build the mapping including instructions for causing the computer to:

obtain a set of source profile connecting space (PCS) data corresponding to a set of source coordinates using a source device profile that provides a forward mapping of sets of source coordinates to sets of source color data;

obtain a set of destination PCS data corresponding to a set of destination coordinates using a destination device profile that provides a forward mapping of sets of destination coordinates to sets of destination color data;

correlate source coordinates and destination coordinates using the source PCS data and the destination PCS data; and effect the building of the mapping according to a preference module that defines user preferences relating to gamut mapping and profile connecting space (PCS), if a preference module is coupled to the computer.

45. The computer program product of claim 44 wherein the preference module is a PCS module including instructions for causing the computer to convert device color data into PCS data, and wherein the instructions for causing the computer to obtain source and destination PCS data include instructions for providing source and destination coordinates to the preference module if the preference module is coupled to the computer.

46. The computer pram product of claim 45 wherein the ins ons for causing the computer to obtain PCS data include instructions for causing the computer to provide configurable PCS parameters to the preference module.

47. The computer program product of claim 46 wherein the set of destination PCS data is a first set of destination PCS data, the instructions for building the mapping further comprising instructions for causing the computer to iterate, if a first error between the first set of destination PCS data and the set of source PCS data is unacceptable, the destination coordinates to produce a second set of destination PCS data such that a second error between the set of source PCS data and the second set of destination PCS data is smaller the first error.

48. The computer program product of claim 47 wherein the instructions for building the mapping further comprise instructions for causing the computer to adjust error criteria according to a gamut mapping module, if a gamut mapping module is coupled to the computer.

49. The computer program product of claim 44 wherein the destination coordinates include three base coordinates and a fourth coordinate, and wherein the preference module provides gray component replacement (GCR) indicia of how to obtain the fourth coordinate, the instructions for causing the computer to obtain the set of destination PCS data further comprising instructions for causing the computer to obtain the fourth coordinate in accordance with the indicia provided by the preference module, if the preference module is coupled to the computer.

50. The computer program product of claim 49 wherein the destination coordinates are CMYK coordinates and the fourth coordinate is a K coordinate indicative of an amount of black to be used by a destination device to produce a color corresponding to the destination coordinates.

51. The computer program product of claim 44, wherein the instructions cause the computer to effect the building of the mapping according to a preference module that defines user preferences relating to gray component replacement (GCR).

* * * * *